March 17, 1925. 1,530,367
H. HORST
PROCESS FOR THE PREPARATION OF RAW PEAT WHICH IS TO
BE DEWATERED BY PRESSING
Filed Oct. 22, 1924
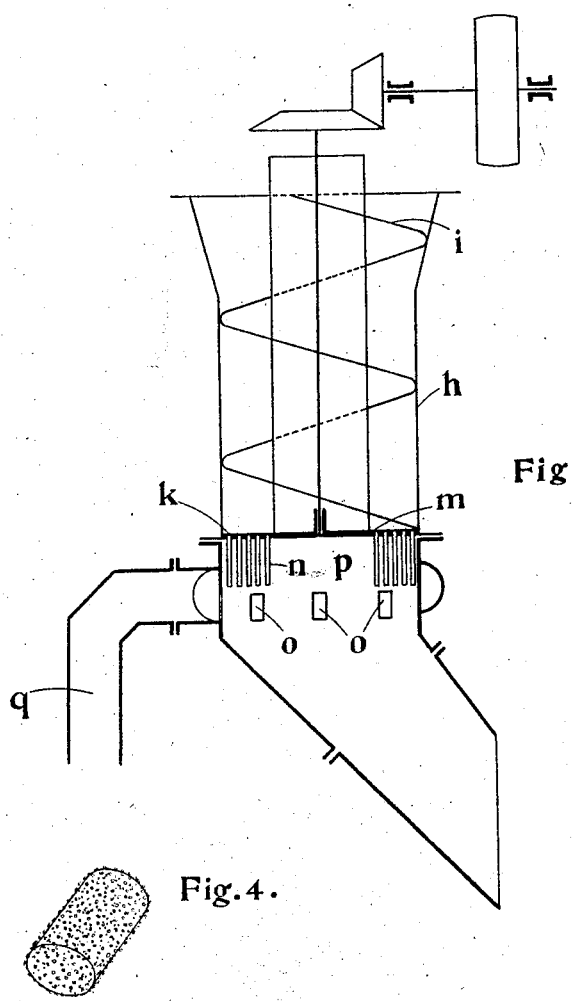
Fig.3.
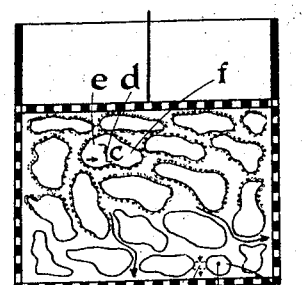
Fig.4.
Fig.1.
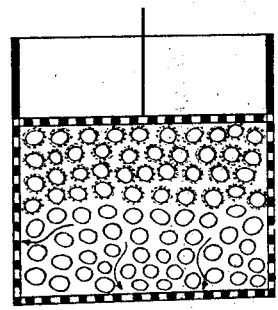
Fig.2.
Inventor
H. Horst
by
W. S. Evans
Attorney.

Patented Mar. 17, 1925.

1,530,367

UNITED STATES PATENT OFFICE.

HEINRICH HORST, OF DUISBURG, GERMANY, ASSIGNOR TO GESELLSCHAFT FUR MASCHINELLE DRUCKENTWASSERUNG MIT BESCHRANKTER HAFTUNG, OF NERDINGEN-ON-THE-RHINE, GERMANY.

PROCESS FOR THE PREPARATION OF RAW PEAT WHICH IS TO BE DEWATERED BY PRESSING.

Application filed October 22, 1924. Serial No. 745,230.

*To all whom it may concern:*

Be it known that I, HEINRICH HORST, a subject of the German State, residing at 17 Hindenburgstrasse, Duisburg, Germany, have invented a certain new and useful Process for the Preparation of Raw Peat Which is to be Dewatered by Pressing, of which the following is a specification.

In the mechanical de-watering of raw peat, that is, de-watering by pressing, with the addition of other bodies, such as dry peat, small coke and the like, great importance was originally attached to the intimate admixture of the additional body with the peat by kneading before the pressing operation. As this process did not produce the desired result, it was subsequently proposed to dispense with the kneading together of the two substances and instead to mix them together as loosely as possible.

This latter process, when carried out according to the proposal above described, is incomplete as it is not possible for every single particle of raw peat to be enveloped by the added substance as intended, because large or small numbers of the pieces of raw peat bind together owing to their doughy nature, and in that condition the large lumps are enveloped in the added substance. This last-mentioned fact is of exceptional importance in de-watering. This fact, however, was not hitherto known, for which reason, also, in reducing the raw peat no value was placed upon the relative sizes of the particles of peat, so that naturally there was nothing to prevent the pieces of reduced peat from varying in size to an almost unlimited extent.

The separate pieces of raw peat are dewatered during the pressing of the mixture under the most diverse conditions. Whilst the small pieces of peat are de-watered within a comparatively short period, so far as is possible by mechanical means, in the case of large pieces of peat the de-watering is effected somewhat later, so that as the de-watered pieces are already pressed together again, there is much dead pressing to be effected. Furthermore, the amount of de-watering to which the whole mass is subjected remains below that which is practically possible, as the large pieces of peat become more and more compacted on their outer surface during the pressing operation and thus stop the exudation of the liquid through the tiny passages produced by the added substance.

All these defects are removed by the process of the present invention, in that the raw peat is continuously reduced in such manner that the separate pieces of peat do not come into contact with one another. This prevents binding of the particles of peat, the particles of peat being then enveloped by the added substance and consequently the formation of large lumps of peat is obviated. The most favorable conditions for de-watering of the separate pieces of peat are thus produced, so that, as the above explanation shows, the extent of de-watering is considerably increased. With regard to the water remaining in the peat, completely homogeneous briquettes are produced, so that the further drying operation proceeds practically uniformly.

To increase the degree of de-watering, the raw peat is, according to the invention, kneaded before being mixed with the added substance and thus rendered more compact, for example, in a peat extrusion press of the known kind. Thus, kneading reduces the volume of the fresh raw peat by the elimination of the air holes which are always present in raw peat. The raw peat thus compressed is advantageously reduced to particles of uniform size, and the reduced peat is mixed with the added substance so that each particle is completely enveloped in the added substance.

In consequence of the preliminary compression of the raw peat a specific weight of raw peat and added substance will take up less space than will an equal weight of unkneaded raw peat with the necessary added substance. Thus the weight of the mixture corresponding to the volume in the pressing space is increased and the output of the effective pressing space is correspondingly increased. Consequently the spatial weight, for instance, of the mixture with kneaded raw peat, in comparison with that of unkneaded raw peat, rises from 0.5 to 0.6, and the output of the pressing space under the same conditions increases by 20%, which is of very exceptional importance in a mechanical pressing plant, A further advantage is that the compression of the raw peat produces an important reduction in the area of the surface of the reduced raw peat, whereby an equal quantity of the added substance provides a surplus thereof, which is of considerable advantage for the draining off of the water from the particles of peat.

It will be understood that the raw peat may be kneaded and disintegrated in the same operation, for example it is advantageous to carry out the process in such manner that the raw peat is squeezed through a sieve wall having the smallest possible perforations of uniform size and after passing through the sieve is powdered over with the added substance.

The invention is illustrated, by way of example, in the accompanying diagrammatic drawings, in which:

Fig. 1 shows in sectional elevation a press in which a mixture of peat and added substance is subjected to pressure according to the known process, and Fig. 2 illustrates the mixture produced in the process of de-watering according to the present invention.

Fig. 3 shows diagrammatically a construction of an apparatus suitable for carrying out the process, and Fig. 4 shows in perspective a single particle of the reduced peat after treatment according to the invention.

Consideration of the pressing operation of the mixture according to Fig. 1 shows:

In order that the minute drop of water $a$ within the piece of peat $b$ may reach the network of passages formed by the compact added substance (indicated in the drawing by arrows), it has to travel only the comparatively short path $c$. On the other hand, according to the heretofore necessary pressing operation the small drop of water $d$ in the particle of peat $f$ is moved forward only a portion of the necessary distance $e$, so that whereas $b$ for instance is de-watered, $f$ can not yet be brought into this condition. If, in addition, it is remembered that the large pieces of peat are compressed more and more about their surface, it is at once in view of the foregoing remarks apparent that it is desirable to de-water the peat in the condition of pieces as small as possible, and as uniform in size as possible, with the admixture of the additional substance, in such manner that each separate particle of the reduced peat is enveloped in the substance, so that a mixture is produced somewhat in the condition indicated in Fig. 2. This is secured in very simple manner by the means set forth herein, and for the purpose the apparatus may be employed which is illustrated in Fig. 3.

In this figure $h$ is the receptacle for the raw peat; $i$ is a helical conveyor which squeezes the mass of peat through the perforations $k$ of the sieve $m$ so that the mass comes through on the underside of the sieve in the form of threads, $n$. To the screw $i$ there is connected the mixing chamber $p$, which is provided with slots $o$ and in which the raw peat and the added substance are mixed. The latter substance is blown into the mixing chamber $p$ by a blowing engine through the pipe $q$ and the slots $o$. By this means the separate threads of peat are uniformly enveloped. Likewise the portions which break off from the threads of peat, which in falling are stretched and are still further reduced, are provided with the additional substance at their end faces. Thus, the finely divided raw peat is completely enveloped by the additional substance, more or less as shown in Fig. 4. The process of de-watering is then completed under the most favourable conditions.

I claim:

1. The process of producing a mixture of raw peat with other substances such as finely divided dry peat, fine coke and the like which comprises reducing the raw peat to relatively small separated particles, and then enveloping the particles, while separated, in the other substances.

2. The process of producing a mixture of raw peat with other substances such as finely divided dry peat, fine coke and the like which comprises squeezing the raw peat through a sieve having small spaced perforations, to produce separated threads of peat, and enveloping the threads, while separated, in the other substances.

HEINRICH HORST.